May 23, 1967
B. M. OLIVER
3,320,850
ROTATION DIRECTION DETECTOR
Filed May 20, 1963
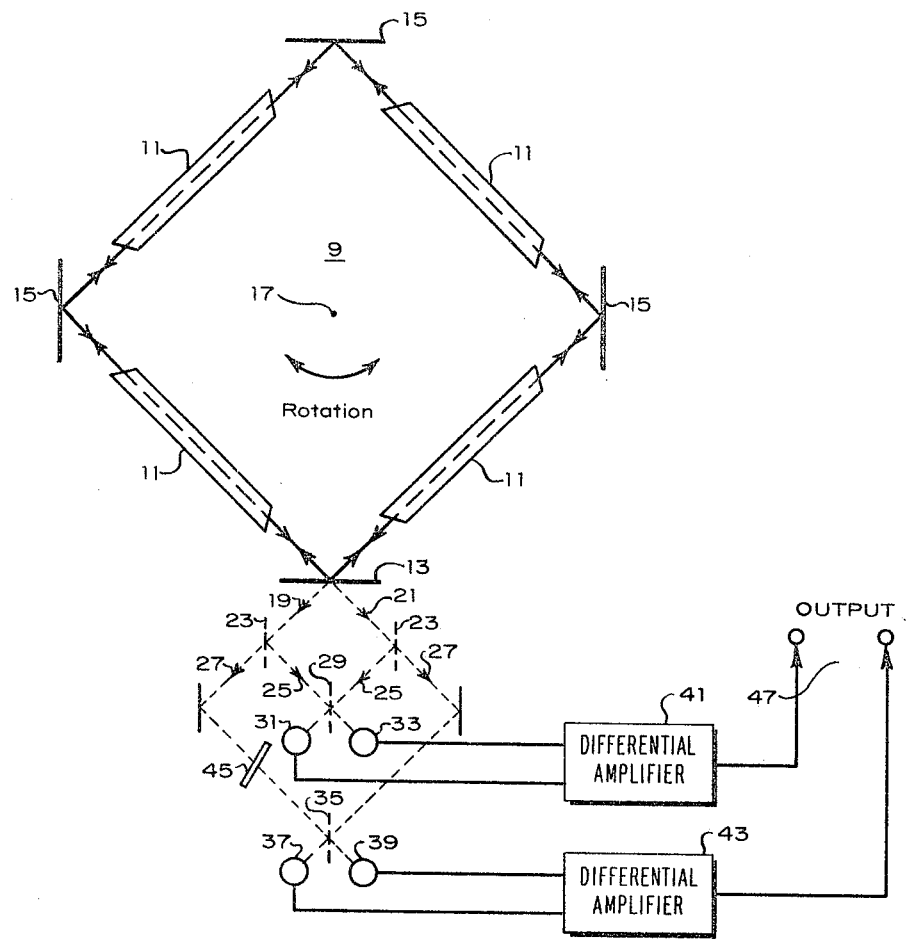
INVENTOR
BERNARD M. OLIVER
BY J. C. Chapman
ATTORNEY

United States Patent Office 3,320,850
Patented May 23, 1967

3,320,850
ROTATION DIRECTION DETECTOR
Bernard M. Oliver, Los Altos Hills, Calif., assignor to Hewlett-Packard Company, Palo Alto, Calif., a corporation of California
Filed May 20, 1963, Ser. No. 281,544
2 Claims. (Cl. 88—14)

This invention relates to ring laser rotation detectors and more particularly to apparatus for detecting the direction of rotation of a ring laser.

It has recently been demonstrated that the beat frequency derived from two independently oscillating laser beams counter rotating around a closed path is proportional to the rate of rotation of the system about an axis normal to the plane defined by the path. In many applications where this effect is used it is desirable to know the direction as well as the rate of rotation.

Accordingly, it is the principal object of the present invention to provide apparatus which produces an indication of direction of rotation of a ring laser rotation-rate detector.

In accordance with the illustrated embodiment of the present invention a ring laser is provided with reflective surfaces at its corners, one of which surfaces shows partial transmission and partial reflection of the laser output. Two independently oscillating laser beams traverse the ring in opposite directions and are partially transmitted through the one surface, thereby producing two output beams. These beams are combined and applied to photoresponsive elements to form a pair of electrical signals, the phase relationship between which is determined by the direction of rotation of the ring laser.

Other and incidental objects of the present invention will be apparent from a reading of this specification and an inspection of the accompanying drawing which shows a pictorial diagram of a ring laser and the physical arrangement of components according to the present invention.

Referring now to the drawing there is shown a ring laser 9 which includes a number of gas tubes 11 disposed along the sides of a square. A partially reflecting mirror 13 is disposed at one corner of the square and totally reflecting mirrors 15 are disposed at the remaining corners of the square. A pair of independently oscillating laser beams transverse the perimeter of the square in opposite directions. Rotation about axis 17 of the device changes the length of the paths traversed by the laser beams and hence changes their frequencies. A portion of each of the beams is transmitted through the surface 13 to form output beams 19 and 21. A beam-splitting plate 23 which includes a partially-transmitting, partial-reflecting surface is disposed within the path of each of the output beams 19 and 21. Each of these beam splitters produces a reflected beam 25 and a transmitted beam 27 from the output beams 19 and 21. The reflected beams 25 are combined in a first mixer 29 which includes a surface having the properties of the beam splitters 23. This mixer produces a pair of signals having a frequency which is equal to the beat or difference between the frequencies of the reflected beams 25. Each of these signals comprises a reflected portion and a transmitted portion of the beams 25 and is applied to a photoresponsive element 31, 33. The transmitted portions of the output beams 27 are combined in a second mixer 35 to form beat signals in a manner similar to that described in connection with the first mixer 29. The beat signals produced by the second mixer are applied to photoresponsive elements 37 and 39. A first amplifier 41 is connected to receive the signals produced by the photoresponsive elements 31 and 33 and is adapted to produce an output signal as a difference between the reflected portions 25 of the output beams received by the photoresponsive elements. A second amplifier 43 is connected to receive the signals produced by the photoresponsive elements 37 and 39 and is adapted to produce a second output signal as the difference between the transmitted portions 27 of the output beams applied to the photoresponsive elements. A phase shifting device 45 is disposed in the path of one of the transmitted portions of the output beams to produce a constant shift in the phase angle of the signals appearing at the outputs of amplifiers 41 and 43. Ideally, this phase shift is made 90 degrees such that a two phase signal is provided at the output terminals 47. The relative phase relationship between the signals appearing at the output terminals 47 is thus determined by the direction of rotation about the axis 17 of the laser ring. Thus, one of the output signals leads the other for clockwise rotation and lags the other for counterclockwise rotation.

I claim:
1. In a ring-laser rotation-rate sensing device having laser beams counter rotating about said ring, a rotation direction detector comprising:
   means for deriving first and second output beams from each of the laser beams counter rotating about said ring, each of said first and second output beams having a frequency related to the effective length of the path about said ring traversed by its respective laser beam;
   means disposed along the paths of said first output beams for combining said first output beams to form a first beat signal having a frequency related to the difference between the frequencies of said laser beams;
   means disposed along the paths of said second output beams for combining said second output beams to form a second beat signal having the frequency of said first resultant signal; and
   means disposed within the path of one of said output beams for shifting the phase thereof;
   the relative plase relationship between said first and second beat signals being indicative of the direction of rotation of said ring laser.

2. In a ring-laser rotation-rate sensing device having laser beams counter rotating about said ring, a rotation direction detector comprising:
   means for producing an output beam from each of the laser beams counter rotating about said ring;
   means disposed along the paths of said output beams for producing first and second beams from each of said output beams as the reflected and transmitted portions of said output beams, respectively;
   means disposed in the path of one of said first and second beams for shifting the phase thereof;
   a first mixer disposed to receive said first beams for producing third and fourth beams, each as the combination of a reflected and a transmitted portion of said first beams applied to the first mixer;
   a second mixer disposed to receive said second beams for producing fifth and sixth beams, each as the combination of a reflected and a transmitted portion of said second beams applied to said second mixer;
   a plurality of photoresponsive elements;
   means including a pair of said photoresponsive elements disposed to receive the third and fourth beams for producing a first output signal therefrom; and
   means including another pair of said photoresponsive elements disposed to receive the fifth and sixth beams for producing a second output signal therefrom, whereby the phase relationship of said first and second output signals is indicative of the direction of rotation of said ring laser.

References Cited by the Examiner

Javan: "Frequency Characteristics of a Continuous Wave He-Ne Optical Maser," J.O.S.A., January 1962, pp. 96–98.

Macek: "Rotation Rate Sensing With Traveling-Wave Ring Lasers," Applied Physics Letters, Feb. 1, 1963, pp. 67–68.

Rosenthal: "Regenerative Circulatory Multiple-Beam Interferometry for the Study of Light Propagation Effects," J.O.S.A., October 1962, pp. 1143–1148.

JEWELL H. PEDERSEN, *Primary Examiner.*

DAVID H. RUBIN, *Examiner.*

E. S. BAUER, *Assistant Examiner.*